United States Patent
Tokasz

(10) Patent No.: US 6,568,514 B1
(45) Date of Patent: May 27, 2003

(54) DAMPING MECHANISM HAVING A PRESSURE ACTUATED ORIFICE SEAL AND A COMPACT INTERNALLY DISPOSED PRESSURE RELIEF ASSEMBLY

(75) Inventor: Scott J. Tokasz, Orchard Park, NY (US)

(73) Assignee: Enidine Incorporated, Orchard Park, NY (US)

( * ) Notice: Subject to any disclaimer, the term of this patent is extended or adjusted under 35 U.S.C. 154(b) by 0 days.

(21) Appl. No.: 09/687,705

(22) Filed: Oct. 13, 2000

(51) Int. Cl.[7] ............................................... F16F 7/12
(52) U.S. Cl. ............................................... 188/376
(58) Field of Search ................................ 188/168, 169, 188/276, 371, 376, 377, 269, 281, 282.1, 316, 317; 267/113, 116

(56) References Cited

U.S. PATENT DOCUMENTS 3,995,842 A * 12/1976 Freitag ........................ 188/376
4,019,403 A * 4/1977 Kondo et al. ........... 188/376 X
4,789,192 A * 12/1988 Warner et al. .............. 188/376
4,823,923 A * 4/1989 Moyer ........................ 188/376

* cited by examiner

Primary Examiner—Matthew C. Graham
Assistant Examiner—Melanie Torres
(74) Attorney, Agent, or Firm—Wall Marjama & Bilinski LLP

(57) ABSTRACT

A single-use damping mechanism. A piston assembly fits within a chamber defined by a piston receiving member. The distal end of the piston receiving member includes a first and second passages which are disposed in fluidic series between the chamber and the ambient air. The first, inner passage is relatively small and controls the damping time of the mechanism. The second, outer passage is relatively large and holds a sealing assembly that prevents fluid from escaping from the chamber, through the first passage, until the mechanism is to be used. The piston assembly includes a pressure relief assembly, which comprises a cavity filled with a compressible material, into and out of which fluid can flow as necessary to protect the mechanism from temperature related pressure changes, and yet which does not interfere with the damping characteristics of the mechanism.

20 Claims, 1 Drawing Sheet

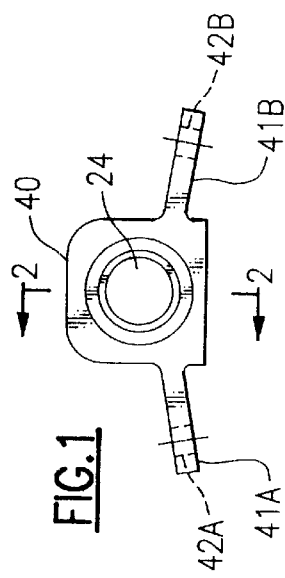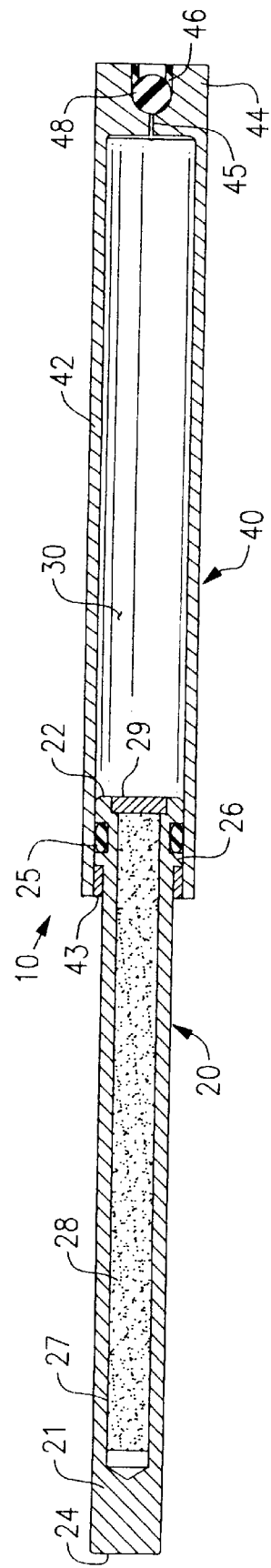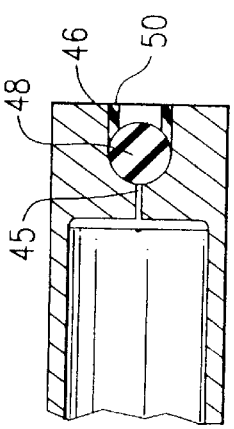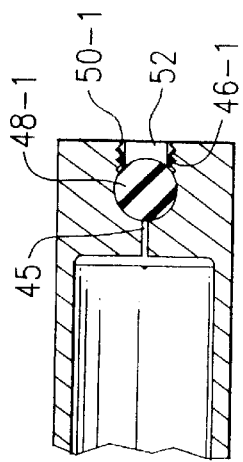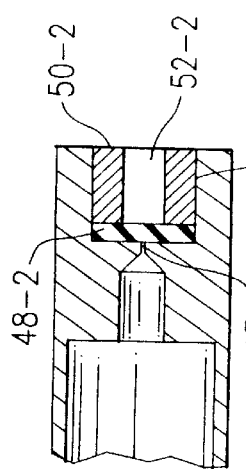

DAMPING MECHANISM HAVING A PRESSURE ACTUATED ORIFICE SEAL AND A COMPACT INTERNALLY DISPOSED PRESSURE RELIEF ASSEMBLY

BACKGROUND OF THE INVENTION

The present invention relates to damping mechanisms, and is directed more particularly to single-use damping mechanisms which include an improved pressure actuated orifice seal and a compact internally disposed pressure relief assembly.

Damping mechanisms have long been known and used to limit, to safe maximum values, the rates or speeds at which moving objects can move between two positions. Such damping mechanisms are of two basic types. A first type, which is known as a multi-use or continuous-duty damping mechanism, is designed to be used again and again over an extended period of time. One example of such a damping mechanism is a door closer, which limits to a safe maximum value, the speed at which a door can swing from its open to its closed position, and thereby assure that the closing of the door does not cause injuries or generate unacceptably loud sounds.

A second type of damping mechanism, which will be referred to herein as a single-use or expendable damping mechanism, is designed to be used only once. One example of a single-use damping mechanism is a deployment damper, a damping mechanism which is used to limit, to a safe maximum value, the speed at which the fin or other jointed part of a countermeasure device or weapon may move from its undeployed to its deployed position after being released from a naval vessel or aircraft. Other examples of single-use damping mechanisms include safety devices which are used in emergencies to prevent dangerously sudden changes in pressure or position.

While existing single-use damping mechanisms can be used in a wide variety of ordinary applications, i.e., applications which do not involve exposure to extremes of temperature or which do not require that the damping mechanisms be located within extremely small spaces, there are important applications which involve just such extremes. The deployment dampers which are used in countermeasure devices that are carried by high performance aircraft, for example, must be extremely small to fit into the spaces within which they are carried, and must be able to operate reliably even after having been exposed to the large changes in temperature that occur during the operation of such aircraft. Some existing damping mechanism designs cannot be used in such applications because the accumulators which they use to compensate for rod volume make them too heavy or bulky to be located in the spaces available for them. Other existing damping mechanisms are small enough that they can be located in the spaces available for them, but cannot be used in such applications because they achieve this small size by eliminating an accumulator, and thereby run the risk that temperature related pressure changes will cause leaks that can result in deployment malfunctions.

In view of the foregoing, it will be seen that a need exists for a single-use damping mechanism which is both compact and light in weight, and which remains ready for immediate use even after being exposed to large changes in temperature.

SUMMARY OF THE INVENTION

In accordance with the present invention, there is provided an improved single-use damping mechanism which is both compact and light in weight, and which remains ready for immediate use even after being exposed to substantial changes in temperature.

Generally speaking, the damping mechanism of the invention includes a piston having a first or distal end which fits within a first or proximal end of a chamber defined by a piston receiving member or housing. This piston receiving member, together with the chamber formed therein, is commonly referred to as a cylinder, even though neither the piston receiving member nor the internal chamber necessarily have a cylindrical shape. The second or distal end of the piston receiving member defines first and second passages which are disposed in fluidic series between the internal chamber and the ambient air. When the piston is in its rest or unactuated position, the space between the distal end of the piston and the distal end of the piston receiving member is filled with a fluid which remains chemically stable in the presence of large changes in temperature, which does not allow the piston or piston receiving member to corrode, and which has the ability to lubricate the movement of the cylinder along the chamber. The volume of this fluid filling is preferably so related to the viscosity of the fluid, the cross-sectional areas of the first and second passages, and the time period during which the mechanism is to damp the movement of the device to be damped, that the chamber becomes empty at the time that the device to be damped reaches its fully deployed position.

In accordance with one important feature of the present invention, the first or inner passage has a cross-sectional area which is preferably relatively small in relation to the cross-sectional area of the internal chamber. As a result, the first passage serves to control and limit the rate at which fluid can be expelled from the internal chamber, and thereby determine, if all other design variables are constant, the duration of the above-mentioned time period. This time period will be referred to herein as the damping time or damping period. The second or outer passage preferably has a cross-sectional area which is relatively large in relation to the cross-sectional area of the first passage, although it too may be small in relation to the cross-sectional area of the internal chamber. As a result, the size of the second passage has no significant effect on the damping time of the damping mechanism. The second passage therefore provides ample space for a sealing or blocking member of the type contemplated by the present invention without affecting the damping time of the damping mechanism.

In accordance with a second important feature of the present invention, the sealing member is held within second passage by a retaining member which is adapted to hold the sealing member in sealing relationship to the first or fluid release passage when the force which the device to be damped applies to the piston has less than a predetermined magnitude, and to allow the sealing member to unseal or otherwise open the first passage when this force has a magnitude greater than or equal to that predetermined magnitude. By designing the damping mechanism so that this predetermined magnitude is exceeded only when the device to be damped is being deployed, the sealing and retaining members assure that the damping mechanism both retains its operating fluid before deployment, and releases it at the desired rate during deployment. The various embodiments of the present invention differ from one another primarily as a result of differences in the manner in which the sealing and retaining members seal and unseal the first passage. In some embodiments, the damping mechanism is designed so that the sealing member not only unseals the first passage, but is ejected from the second passage and, consequently, from the damping mechanism as a whole. In other embodiments, the damping mechanism is designed so that the sealing member remains in place, but tears or ruptures to release the fluid through the first and second passages.

In a first embodiment, the retaining member is a metal element which has a ring or sleeve-like shape, and which is adapted to be press fit into the second passage distally of the sealing member. In this embodiment, the tightness of the fit is selected so that the force acting on the sealing member during deployment pushes both sealing member and the retaining member out of the second passage, thereby allowing fluid to escape from the internal chamber at the desired rate. In a second embodiment, the retaining member is designed so that it is fixedly secured to the sides of the second passage, and the sealing member is designed to have elastomeric properties that allow it to be extruded through the hole through the retaining member. In a third embodiment, the retaining member is designed to be sufficiently weak that it ruptures or tears during deployment. It will be understood, however, that these embodiments are exemplary only, and that other releasing mechanisms may be used in practicing the present invention.

In accordance with a third important feature of the present invention, the damping mechanism is provided with an internally disposed pressure relief assembly for preventing temperature-related pressure changes from dislodging the sealing member before the device to be damped is deployed. This pressure relief structure preferably takes the form of a cavity which is located inside of the shaft of the piston, and which is disposed in fluidic communication with the internal chamber of the damping mechanism through an end cap that comprises a filter having numerous fine pores. In preferred embodiments, this cavity is filled with a chemically inert compressible material, such as a closed-pore foam. This pressure relief assembly protects the damping mechanism from temperature-related pressure changes by allowing fluid to flow slowly from the internal chamber to the cavity within the piston shaft, and back again, as necessary to prevent the pressure of the fluid within the internal chamber from becoming high enough to allow fluid to leak out of the damping mechanism. Because the pores of the end cap are fine, i.e., small in relation to the size of the first passage, however, fluid cannot flow from the internal chamber to the pressure relief cavity rapidly enough to affect the ability of the piston to move along the chamber in the intended manner when the damping mechanism is used. Thus, the pressure relief structure of the invention operates only when its operation is beneficial.

Other objects and advantages of the invention will be apparent from the following description and drawings.

DESCRIPTION OF THE DRAWINGS

FIG. 1 is an end view of a damping mechanism constructed in accordance with the present invention;

FIG. 2 is a cross-sectional view of the damping mechanism of FIG. 1 taken along section 1—1 thereof; and FIGS. 3 through 5 are enlarged fragmentary cross-sectional views of the end portions of three different embodiments of damping mechanisms constructed in accordance with the present invention.

DESCRIPTION OF THE PREFERRED EMBODIMENTS

Referring to FIGS. 1 and 2 there are shown respective end and side cross-sectional views of one embodiment of a damping mechanism 10 constructed in accordance with the present invention. For the sake of clarity, damping mechanism 10 of FIGS. 1 and 2 is shown much larger than its actual size. If shown at a size that were useful for a typical application, damping mechanism 10 of FIG. 2 would have a length of approximately 9 cm (3.5 inches).

Damping mechanism 10 includes a piston 20 having a shaft 21 and distal end 22 which is slidably disposed within an internal chamber 30 defined by a piston receiving assembly 40 that includes a housing 42. Internal chamber 30 is filled with a suitable, chemically inert hydraulic fluid. This fluid is prevented from escaping from the damping mechanism, along the boundary between piston 20 and housing 42, by a suitable elastomeric sealing ring 25.

As is best shown in FIG. 1, internal chamber 30 is generally circular in shape and forms a smooth generally cylindrical surface along which piston 20 may slide during the deployment of the device to be deployed, such as a fin, not shown. The latter device will ordinarily be located so that it, or an intervening linkage, is in contact with the proximal end 24 of shaft 21 of piston 20, and so that it pushes piston 20 along chamber 30 as deployment proceeds. Piston receiving assembly 40 preferably includes a pair of outwardly projecting mounting flanges 41A and 41B, best shown in FIG. 1, that include holes 42A and 42B which may be used with suitable fastening structures, such as bolts, to secure assembly 40 to the device to be deployed.

In FIGS. 1 and 2, piston assembly 10 is shown in its fully withdrawn or undeployed position, that is, the position which it is in before the device to be deployed is released from the craft which carries it. This position is fixed by a metal retaining ring 43 which is secured to housing 42, and which is adapted to engage a circular flange 26 located near the distal end of piston 20 and thereby hold the latter in place within chamber 30.

In accordance with one important feature of the present invention, the fluid within chamber 30 is prevented from escaping from damping mechanism 10, and piston 20 is prevented from moving away from its undeployed position, unless and until the deployment force acting on shaft 21 of piston 20 exceeds a predetermined magnitude, i.e., a magnitude that indicates that deployment is occurring. To the end that this requirement may be met, the distal end 44 of housing 42 of piston receiving assembly 40 is provided with first and second passages 45 and 46, respectively, which are disposed in fluidic series between internal chamber 30 and the outside of mechanism 10, i.e., the ambient air. As will be explained more fully presently, the first passage serves to set the damping time of mechanism 10, while the second passage serves as a part of the sealing structure which assures that passage 45 remains sealed unless and until the deployment force acting on shaft 21 exceeds that predetermined magnitude.

First or inner passage 45 preferably has a cross-sectional area which is relatively small in relation to the cross-sectional area of chamber 30. The cross-sectional area and length of passage 45 are such that passage 45 exhibits a fluidic resistance which allows there to be expelled from chamber 30, within the desired damping time, sufficient fluid to allow piston 20 to move from its undeployed to its fully deployed position. The exact size which first passage 45 must have in order to establish this fluidic resistance is dependent primarily upon the cross-sectional area and length of chamber 30 and on the viscosity of the hydraulic fluid used therein. While these dimensions will vary from application to application, they may be calculated, for a given application, using equations which are known to those skilled in the art. Accordingly, the manner in which the size of first passage 45 is determined will not be discussed in detail herein.

Second or outer passage 46 preferably has a cross-sectional area which is relatively large, in relation to the cross-sectional area of first passage 45, but which is relatively small in relation to the cross-sectional area of internal chamber 30. This relatively large size is desirable because assures that second passage 46 has no significant effect on the rate at which the fluid can be pushed out of chamber 30 and, consequently, on the damping time of damping mechanism 10. Its relatively large size also provides ample space for the sealing assembly of the invention and, consequently, makes the damping mechanism easy to assemble.

The various embodiments of the present invention differ from one another primarily as a result of differences in the structures of their sealing assemblies. In a first embodiment, shown in FIG. 3, the sealing assembly includes a sealing or blocking member 48, which has a generally spherical shape and which is composed of a suitable elastomeric material, and a retaining member which preferably comprises a metal ring 50. Metal ring 50 is sized so that it fits sufficiently tightly within passage 46 to maintain sealing member 48 in sealing relationship to first passage 45 when the deployment force acting on shaft 21 has a magnitude less than the desired deployment value, and yet so that it can be ejected from second passage 46 to unseal first passage 45 when the deployment force equals or exceeds that value. This ejecting force is applied to retaining ring 50 by sealing member 48 as a result of the force that is applied to shaft 21 of piston 20 by the device being deployed. Accordingly, sealing member 48 of the embodiment of FIG. 3 should be composed of an elastomeric material which is sufficiently inelastic or stiff that it can exert on ring 50 a force sufficient to push the latter out of passage 46.

In a second embodiment, shown in FIG. 4, the sealing assembly includes a sealing member 48-1 which has a generally spherical shape and which is again composed of a suitable elastomeric material. In the embodiment of FIG. 4, however, the retaining member comprises a metal ring 50-1 having external threads that allow it to be threadedly secured within second passage 46-1 to maintain sealing member 48 in sealing relationship to first passage 45 when the deployment force acting on shaft 21 has a magnitude less than the desired deployment value, and an interior opening 52 through which sealing member 48-1 is extruded when the deployment force exceeds that value. The force necessary to eject sealing member 48-1 through opening 52 is applied to member 48-1 as a result of the force that is applied to shaft 21 of by piston 20 by the device being deployed. Accordingly, sealing member 48-1 of the embodiment of FIG. 4 should be composed of an elastomeric material which is sufficiently elastic or soft that it can extrude through opening 52 of retaining member 50-1.

In a third embodiment, shown in FIG. 5, the sealing assembly includes a sealing member 48-2 which has a generally planar, disc-like shape, and which is preferably composed of a relatively flexible but rupturable or tearable elastomeric material. The sealing assembly also includes a retaining member 50-2 which is firmly secured to the walls of second passage 46-2, and which includes a central opening 52-2. When the deployment force acting on shaft 21 has a magnitude less than the desired deployment value, retaining member 50-2 holds sealing member 48-2 in sealing relationship to first passage 45. When the deployment force acting on shaft 21 has a magnitude that equals or exceeds the deployment value, the pressure within passage 45 becomes high enough to cause sealing member 48-2 to expand or balloon out until it ruptures or tears. As this occurs, the fluid within chamber 30 flows out of damping mechanism 10 through passage 45, sealing member 48-2 and central opening 52-2 of retaining member 50-2, and thereby allows deployment to proceed.

In view of the foregoing it will be seen that the practice of the present invention is not limited to the use of sealing assemblies which have a particular shape, or which are composed of a particular elastomeric material. It will therefore be understood that sealing assemblies of the above-described types are exemplary only, and that all sealing assemblies which use the above-described operating principles are within the contemplation of the present invention.

In accordance with another important feature of the present invention, the damping mechanism includes an internally disposed pressure relief assembly which prevents the fluid in chamber 30 from escaping therefrom as changes in the temperature of the damping mechanism cause the parts thereof to expand and contract, and thereby change the pressure of that fluid. In all embodiments of the invention this assembly includes a cavity which extends from distal end 22 of piston 20 into shaft 21 thereof, and which is occupied by a compressible material that allows fluid to flow into and out of chamber 30 as necessary to prevent these changes in the pressure from causing fluid to escape from chamber 30 around sealing members 25 and 48. In all preferred embodiments of the invention this cavity is closed by an end cap that includes pores or passages which have sizes which are small in relation to that of first passage 45. These pores also preferably have sizes which are so related to the viscosity of the fluid in chamber 30, that they present a relatively small resistance to the flow of fluid at low pressures, where flow tends to be laminar, but a relatively high resistance to the flow of fluid at high pressures, where flow tends to be turbulent. As a result, the pressure relief assembly of the invention is able to limit the pressure within chamber 30 to a relatively low value when the magnitude of the force applied thereto changes slowly, as it does when the damping mechanism expands and contracts as a result of changes in temperature, but not able to limit the pressure in chamber 30 to a relatively low value when the magnitude of the force applied thereto increases rapidly, as it does when the damping mechanism is activated.

One embodiment of the pressure relief assembly of the invention is shown in FIG. 2. In the embodiment of FIG. 2 this assembly includes a cavity 27 which extends along the longitudinal axis of shaft 21 of piston assembly 20. Cavity 27 is filled with a relatively nonporous compressible material 28, such as a closed-pore foam, and is closed by an end cap 29, which may be made of a relatively hard porous material, such as sintered metal. This porous material defines pores or passages which have sizes that allow end cap 29 to function, in the manner described above, to relieve or not relieve changes in the pressure of the fluid within chamber, depending on whether these changes in pressure are produced by forces which change slowly or by forces which change rapidly.

When damping mechanism 10 is in its undeployed state, changes in the temperature of the damping assembly cause fluid to flow slowly from cavity 30 to cavity 27, or vice-versa, thereby preventing the pressure within chamber 30 from becoming high enough to force its way around seals 25 and 48. As this occurs, there is a corresponding compression or expansion of compressible filling material 28. When damping mechanism 10 is in its deploying state, however, the force on piston 20 is too large and changes too quickly to allow the pressure within chamber 30 to be released by the flow of fluid from chamber 30 to cavity 27. As a result, the pressure within chamber is able to rise to a magnitude high enough to cause the sealing assembly to unseal first passage 45, and thereby permit the device being damped to be deployed within the desired deployment time. Thus, the pressure relief assembly protects the damping mechanism from temperature-related pressure changes when the latter is in its pre-deployment state, but does not interfere with the ability of the damping mechanism to deploy in the intended manner when the latter is in its deploying state.

While the present invention has been described with reference to a number of specific embodiments, it will be understood that the true spirit and scope there should be determined only with reference to the following claims.

What is claimed is:

1. A single use damping mechanism, comprising, in combination:
   (a) a piston having a first end and a second end;
   (b) a housing defining an internal chamber for receiving said piston, said housing having:
      (i) a first end defining an opening through which the first end of said piston may advance into said internal chamber;
      (ii) a second end defining at least first and second passages which are disposed in fluidic series between said internal chamber and the ambient air, and through which a fluid disposed in said internal chamber may escape from the damping mechanism as said piston advances into said internal chamber;
      (iii) said first passage having a first cross-sectional area dependent upon the magnitude of the damping to be provided by said damping mechanism, and said second passage having a second cross-sectional area larger than said first cross-sectional area;
   (c) means for maintaining a slidable seal between said piston and said chamber;
   (d) a sealing member disposed within said second passage for preventing said fluid from escaping from said chamber through said first passage; and
   (e) a retaining member disposed within said second passage for retaining said sealing member in sealing relationship to said first passage unless when a force acting on the second end of said piston exceeds a predetermined magnitude.

2. The damping mechanism of claim 1 in which said piston has a first, unactuated position in which the first end of said piston is located a relatively small distance from said opening, and a series of second, actuated positions in which the first end of said piston is located at greater distances from said opening, and in which said sealing member is ejected from said second passage as the distance between the first end of said piston and said opening increases.

3. The damping mechanism of claim 2 in which said retaining member defines an interior opening having a size smaller than said sealing member, and in which said sealing member is extruded through the opening in said retaining member after said force exceeds said predetermined magnitude.

4. The damping mechanism of claim 2 in which said retaining member is press fit into said second passage, and in which said sealing member and said retaining member are ejected from said passage after said force exceeds said predetermined magnitude.

5. The damping mechanism of claim 1 in which said piston has a first, unactuated position in which the first end of said piston is located a relatively small distance from said opening, and a series of second, actuated positions in which the first end of said piston is located at greater distances from said opening, and in which said sealing member is designed to rupture as the distance between the first end of said piston and said opening increases.

6. The damping mechanism of claim 1 in which said piston defines a cavity which fluid within said internal chamber may flow into or out of to prevent temperature related changes in pressure of the fluid in said internal chamber from breaking the sealing relationship between said sealing member and said first passage.

7. The damping mechanism of claim 6 in which said cavity is filled with a compressible material.

8. The damping mechanism of claim 7 in which said compressible material comprises a closed-pore foam.

9. The damping mechanism of claim 6 in which said cavity has an end which is closed by a cap that comprises a porous material having pores which are small in relation to the size of said first passage.

10. The damping mechanism of claim 7 in which said cavity has an end which is closed by a cap that defines pores having sizes which are so related to the viscosity of said fluid that the flow of fluid through said cap is laminar when the pressure of the fluid in said chamber changes relatively slowly, but turbulent when the pressure of the fluid in said chamber changes relatively rapidly.

11. A single use damping mechanism, comprising, in combination:
   (a) a piston having a first end and a second end;
   (b) piston receiving means for receiving said piston, said piston receiving means having an exterior surface and an interior surface, said interior surface defining a chamber along which said piston may be pushed, said piston receiving means including:
      (i) a first end defining an inlet opening through which the first end of said piston may be pushed into said chamber;
      (ii) a second end defining an outlet through which a fluid disposed in said internal chamber may flow out of said chamber as said piston is pushed into said chamber, said outlet comprising at least first, proximal passage which is in direct fluidic communication with said chamber and a second, distal passage which is disposed between said first passage and said exterior surface;
      (iii) said first passage having a first cross-sectional area dependent upon the magnitude of the damping to be provided by said damping mechanism, and said second passage having a second cross-sectional area larger than said first cross-sectional area;
   (c) means for maintaining a slidable seal between said piston and said chamber;
   (d) elastomeric blocking means disposed within said second passage for blocking the flow of said fluid through said first passage when said blocking means is in a seated position; and
   (e) retaining means for holding said elastomeric blocking means in place when a force acting on the second end of said piston has less than a predetermined magnitude, and for allowing said blocking means to release fluid through said first passage when said force is greater than said predetermined magnitude.

12. The damping mechanism of claim 11 in which said piston has a first, unactuated position in which the first end of said piston is located a relatively small distance from said inlet opening, and a series of second, actuated positions in which the first end said piston is located at greater distances from said inlet opening, and in which said blocking means is ejected from said second passage as the distance between said inlet opening and the first end of said piston increases.

13. The damping mechanism of claim 11 in which said retaining means defines an interior opening having a size smaller than said blocking means, and in which said blocking means is extruded through the opening in said retaining means after said force exceeds said predetermined magnitude.

14. The damping mechanism of claim 11 in which said retaining means is press fit into said second passage, and in which said blocking means and said retaining means are ejected from said passage after said force exceeds said predetermined magnitude.

15. The damping mechanism of claim 11 in which said piston has a first, unactuated position in which the first end of said piston is located a relatively small distance from said inlet opening, and a series of second, actuated positions in which the first end said piston is located at greater distances from said inlet opening, and in which said blocking means is designed to rupture as the distance between said inlet opening and the first end of said piston increases.

16. The damping mechanism of claim 11 in which said first end of said piston defines a cavity which fluid within said chamber may flow into or out of to prevent temperature related changes in pressure of the fluid in said chamber from unblocking said blocking means.

17. The damping mechanism of claim 16 in which said cavity is filled with a compressible material.

18. The damping mechanism of claim 17 in which said compressible material comprises a closed-pore foam.

19. The damping mechanism of claim 16 in which said cavity has an end which is closed by an end member which comprises a porous material having pores which are small in relation to the size of said first passage.

20. The damping mechanism of claim 16 in which said cavity has an end which is closed by an end member that defines pores having sizes which are so related to the viscosity of said fluid that the flow of fluid through said end member is laminar when the pressure of the fluid in said chamber changes relatively slowly, but turbulent when the pressure of the fluid in said chamber changes relatively rapidly.

* * * * *